(12) United States Patent
Carlsson et al.

(10) Patent No.: US 7,009,948 B1
(45) Date of Patent: Mar. 7, 2006

(54) SYSTEMS AND METHODS FOR PROVIDING GPS TIME AND ASSISTANCE IN A COMMUNICATIONS NETWORK

(75) Inventors: Hans Carlsson, Cary, NC (US); Havish Koorapaty, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 989 days.

(21) Appl. No.: 09/679,360

(22) Filed: Oct. 5, 2000

(51) Int. Cl.
*H04Q 7/00* (2006.01)

(52) U.S. Cl. .................. 370/329; 370/465; 342/357.06

(58) Field of Classification Search ................ 370/322, 370/326, 329, 335, 336, 342, 343, 345; 342/357.06, 342/357.12
See application file for complete search history.

(56) References Cited

U.S. PATENT DOCUMENTS

| 5,546,443 | A | * | 8/1996 | Raith .......................... 455/450 |
| 5,857,155 | A | * | 1/1999 | Hill et al. ................. 455/456.3 |
| 6,118,977 | A | * | 9/2000 | Vannucci ................... 455/12.1 |
| 6,438,115 | B1 | * | 8/2002 | Mazur et al. ............... 370/330 |

FOREIGN PATENT DOCUMENTS

| WO | 99/19743 | 4/1999 |
| WO | 00/41425 | 7/2000 |

OTHER PUBLICATIONS

LM Ericsson: "Stage One for System Assisted Mobile Positioning through Satellite (SAMPS)", http://ftp.tiaonline.org/TR-45/TR451/Incoming/2000.04.12_Contributions/2000/04.12.03-Attachment.pdf, Feb. 22, 2000, pp. 1-10.
"TDMA Third Generation Wireless Packet-Data Service—Mobility Management", ANSI/TIA/EIA-136-336-2000, Telecommunications Industry Association, Mar. 31, 2000, 81 pages.
"TDMA Third Generation Wireless—System Assisted Mobile Positioning Through Satallite (SAMPS) Teleservices", ANSI/TIA/EIA-136-740-2001, Telecommunications Industry Association, Apr. 23, 2001, 66 pages.
LM Ericsson: "Stage Two for System Assisted Mobile Positioning through Satellite (SAMPS)", http://ftp.tiaonline.org/TR-45/TR451/Incoming/2000.05.18- Contributions/TR45.1_2000.05.18.01(TR-45.2.SAMPS-Stage%202).pdf, May 8, 2000. 10 pages.
"Digital Cellular Telecommunications System (Phase 2+); Location Services (LCS); Broadcast Network Assistance for Enhanced Observed Time Difference (E-OTD) and Global Positioning System (GPS) Positioning Methods (GSM 04.35 version 8.1.0 Release 1999)", ETSI TS 101 528 V8.1.0, Jun. 2000, pp. 1-36.
"TDMA Third Generation Wireless Digital Control Channel Layer 3", ANSI/TIA/EIA-136-123-B-2000, Telecommunications Industry Association, Mar. 31, 2000, pp. 27-88.
Technical Specification Group Services and System Aspects; Functional Stage 2 Description of Location Services in GERAN; 3GPP; 3G TS 43.059 V0.01 (2000-XX); pp. 1-28; Aug. 31, 2000.
TDMA Third Generation Wireless System Assisted Mobile Positioning through Satellite (SAMPS) Teleservice; SP-4027-740 Draft Text; pp. 1-52; Jul. 21, 2000.

* cited by examiner

*Primary Examiner*—John Pezzlo
*Assistant Examiner*—Donald L Mills
(74) *Attorney, Agent, or Firm*—Coats & Bennett, P.L.L.C.

(57) ABSTRACT

A method for performing a position fix by a mobile terminal camped on a packet control channel is provided. The method includes transmitting a request for Global Positioning System (GPS) assistance data via the packet control channel and receiving the requested assistance data via the packet control channel. The method also includes performing the position fix using the received assistance data.

5 Claims, 11 Drawing Sheets

SYSTEMS AND METHODS FOR PROVIDING GPS TIME AND ASSISTANCE IN A COMMUNICATIONS NETWORK

BACKGROUND OF THE INVENTION

The present invention relates generally to networks and, more particularly, to providing global positioning system (GPS) time and assistance data in a wireless communication network.

Today's mobile communications users desire increasingly fast, more robust and more efficient wireless communication systems. Accordingly, manufacturers and standards bodies are continually improving current systems and implementing new standards to support additional capabilities. One such standard for providing data over both Global System for Mobile communications (GSM) and Time Division Multiple Access (TDMA)/136 systems is the Enhanced General Packet Radio Service (EGPRS).

An EGPRS-136 system integrates the TIA/EIA-136 circuit-switched air interface with the General Packet Radio Service (GPRS) as specified in GSM. More specifically, EGPRS-136 supports circuit-switched services on a 30 kHz air-interface as specified in TIA/EIA-136 and TIA/EIA-41 (ANSI-41) and packet data service on a 200 kHz air interface as specified in GSM. Thus, an EGPRS-136 mobile terminal may send and receive voice calls, as well as, send and receive e-mails, surf the web, etc.

One area of wireless communications that has seen a lot of attention in recent years is the area of mobile terminal positioning. System Assisted Mobile Positioning through Satellite (SAMPS) is a positioning solution for TDMA/ANSI-41 that utilizes the existing GPS infrastructure. A SAMPS-capable mobile terminal is equipped with a GPS receiver to support the positioning procedures. The SAMPS service also utilizes the data capabilities of TIA/EIA-136 networks to enhance the performance of GPS-equipped mobile terminals by providing "assistance."

For example, a SAMPS-capable mobile terminal may be provided with the following pieces of assistance data by the SAMPS service: Almanac, Ephemeris and Clock Corrections, Ionospheric Corrections, Reference Time, and Reference Location information. The Almanac provides a long term model for the orbital parameters of the satellites and is useful in determining a coarse position of the satellites at a given reference location at a certain reference time.

The Ephemeris and Clock Corrections allow accurate computation of the positions of the GPS satellites at the time of the measurements. Mobile terminals may use the Ionospheric Corrections to compensate for ionospheric delays through the atmosphere.

Reference Location provides a typically crude estimate, to within approximately 50–100 km (in some cases it may be more accurate), of the mobile terminal's current position. Reference Location may be obtained either from the network (e.g., from control channels) or from previous recent position fixes using the GPS receiver.

Reference Time provides an estimate of the current GPS time. Reference Time may be obtained, for example, from a digital control channel (DCCH) by sending a relationship between the GPS time and time on the DCCH for some epoch of the GPS time. When the mobile terminal is camping on the DCCH, the DCCH time is available at any instance. The mobile terminal may compute the GPS time at a given instance by adding the difference between the current epoch and the epoch for which the GPS time to DCCH time relationship was provided to the GPS time.

BRIEF SUMMARY OF THE INVENTION

Systems and methods, consistent with the present invention, maintain updated GPS time and assistance data in mobile terminals camped on packet control channels.

In accordance with the invention as embodied and broadly described herein, a method for determining GPS time in a mobile terminal camped on a first control channel from which a relationship to GPS time is unavailable is provided. The method includes switching from the first control channel to a second control channel from which a relationship to GPS time is available; acquiring the GPS time to second control channel time relationship; and determining the GPS time using the relationship.

In another implementation consistent with the present invention, a method for determining GPS time in a mobile terminal camped on a first control channel is provided. The method includes transmitting a request for a GPS time to second control channel time relationship via the first control channel, the request specifying a second control channel with which the mobile terminal is associated; receiving a value indicative of the relationship between GPS time and a time for the second control channel with which the mobile terminal is associated; and determining the GPS time using the received value.

In yet another implementation consistent with the present invention, a method for performing a position fix by a mobile terminal camped on a packet control channel is provided. The method includes transmitting a request for GPS assistance data via the packet control channel, receiving the requested assistance data, and performing the position fix using the received assistance data.

In a further implementation consistent with the present invention, a mobile terminal includes a memory that stores instructions and a processor. The processor executes the instructions to receive a position request, switch from a first control channel to a second control channel, acquire GPS assistance data via the second control channel, and perform a positioning fix using the acquired GPS assistance data.

In yet a further implementation consistent with the present invention, a device in a wireless communication network includes a memory that stores instructions and a processor. The processor executes the instructions in the memory to receive a request for assistance data from a mobile terminal tuned to a packet control channel, and transmit the assistance data to the mobile terminal via the packet control channel.

In still a further implementation consistent with the present invention, a method for acquiring GPS assistance data in a mobile terminal tuned to a first control channel from which GPS assistance data is unavailable is provided. The method includes switching from the first control channel to a second control channel from which GPS assistance data is unavailable; determining whether a preferred control channel, from which GPS assistance data is available, associated with the first control channel is in a list of control channels, from which GPS assistance data is available, associated with the second control channel; finding a new preferred control channel from which GPS assistance data is available when the preferred control channel is not is the list; and acquiring the GPS assistance data on the new preferred control channel.

In another implementation consistent with the present invention, a computer-readable medium containing instructions for controlling at least one processor to perform a method for determining a relationship between time associated with control channels in a wireless communication network and a GPS time is provided. The method includes receiving a request to determine time, the request identifying at least one packet control channel and at least one non-packet control channel; tuning to the identified at least one packet control channel; reading time information associated with the identified at least one packet control channel; tuning to the identified at least one non-packet control channel; reading time information associated with the identified at least one non-packet control channel; and determining relationships between the GPS time and time information associated with the identified at least one packet control channel and the identified at least one non-packet control channel.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the present invention, allow mobile terminals that are camped on packet control channels, such as EGPRS-136 control channels, to maintain updated GPS time and assistance data. While the foregoing description provides for operation of a mobile terminal in an EGPRS-136 environment, it will be appreciated that the techniques described herein are equally applicable to other wireless communication environments.

Figure 1:
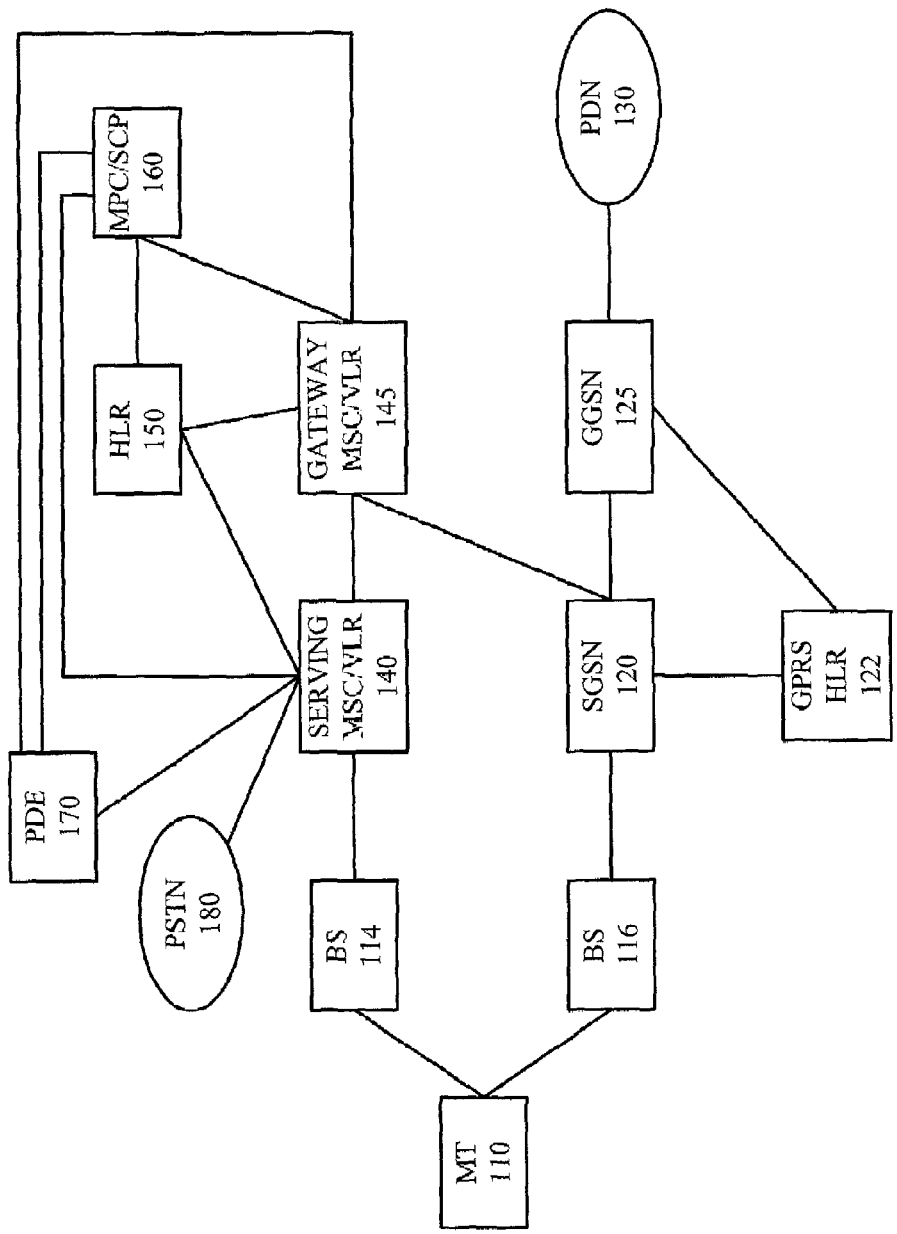
FIG. 1 illustrates an exemplary network in which systems and methods, consistent with the present invention, may be implemented.

FIG. 1 illustrates an exemplary network 100 in which systems and methods, consistent with the present invention, may be implemented. The network 100 may include a mobile terminal (MT) 110, a group of base stations (BS) 114 and 116, a Serving General Packet Radio Service (GPRS) Serving Node (SGSN) 120, a GPRS Home Location Register (HLR) 122, a Gateway GPRS Serving Node 125, a Public Data Network (PDN) 130, a serving Mobile Switching Center (MSC)/Visitor Location Register (VLR) 140, a gateway MSC/VLR 145, a HLR 150, a Mobile Position Center (MPC)/Signal Control Point (SCP) 160, a Position Determining Entity (PDE) 170, and a Public Switched Telephone Network (PSTN) 180. The number of components illustrated in FIG. 1 is provided for simplicity. It will be appreciated that a typical network 100 may include more or less components than are illustrated in FIG. 1.

The mobile terminal 110 allows a user to interact with other devices via PDN 130 or PSTN 180. It is assumed hereafter that the mobile terminal 110 communicates using EGPRS-136 to send and receive data via the PDN 130 and Time Division Multiple Access (TDMA) to make and receive calls through the PSTN 180. As described herein, the mobile terminal 110 may include a radiotelephone with or without a multi-line display; a Personal Communications System (PCS) terminal that may combine a cellular radiotelephone with data processing, facsimile, and data communications capabilities; a Personal Digital Assistant (PDA) that can include a radiotelephone, pager, Internet/intranet access, Web browser, organizer, and/or calendar; and a conventional laptop and/or palmtop receiver or other appliance that includes a radiotelephone transceiver. Mobile terminals may also be referred to as "pervasive computing" devices.

The base stations 114 and 116 allow other devices to communicate with mobile terminal 110. Base station 114 may provide the mobile terminal 110 with circuit-switched services on, for example, a 30 kHz air interface. Base station 116 may provide the mobile terminal 110 with packet data services on, for example, a 200 kHz air interface. Each base station 114 and 116 may include one or more base transceiver stations (not shown) and a base station controller (not shown). The base transceiver stations may transmit radio signals to and receive radio signals from the mobile terminal 110. The base station controller may interconnect a number of base transceiver stations to the SGSN 120 or serving MSC/VLR 140.

The SGSN 120 may include circuitry for controlling packet data sessions between the mobile terminal 110 and other devices. The SGSN 120 may connect those sessions to the GGSN 125. The GPRS HLR 122 may include one or more databases that store and manage subscriber data for a subscriber's packet data services. Upon interrogation by the SGSN 120, the GPRS HLR 122 may provide packet data subscription-related information. Upon interrogation by the GGSN 125, the GPRS HLR 122 may provide routing information for the indicated subscriber.

The GGSN 125 may include circuitry for connecting packet data sessions between the mobile terminal 110 and the PDN 130. The PDN 130 may include one or more conventional networks for routing data packets.

The serving MSC/VLR 140 may include circuitry for controlling circuit calls to/from the mobile terminal 110 and other devices and connects those calls to the PSTN 180. The gateway MSC/VLR 145 may control circuit-related signaling to/from the mobile terminal 110 during those periods when the mobile terminal 110 is camped on a packet channel. The gateway MSC/VLR 145 tunnels this signaling to the mobile terminal 110 in a well-known manner through the SGSN 120. Tunneling involves, for example, the use of circuit-switched protocols on a packet control channel.

Similar to the GPRS HLR 122, the HLR 150 may include one or more databases that store and manage subscriber data for a subscriber's circuit-switched services. Upon interrogation by the serving MSC/VLR 140, the HLR 150 provides routing information for the indicated subscriber.

The MPC/SCP 160 may include circuitry for providing information regarding a mobile terminal's 110 position in response to positioning requests. The PDE 170 includes circuitry for determining a mobile terminal's 110 position and/or helps a mobile terminal 110 determine its own position. The PSTN 180 may include the worldwide telephone network, consisting of wires and switches, that allows for connection of telephone calls.

Figure 2:
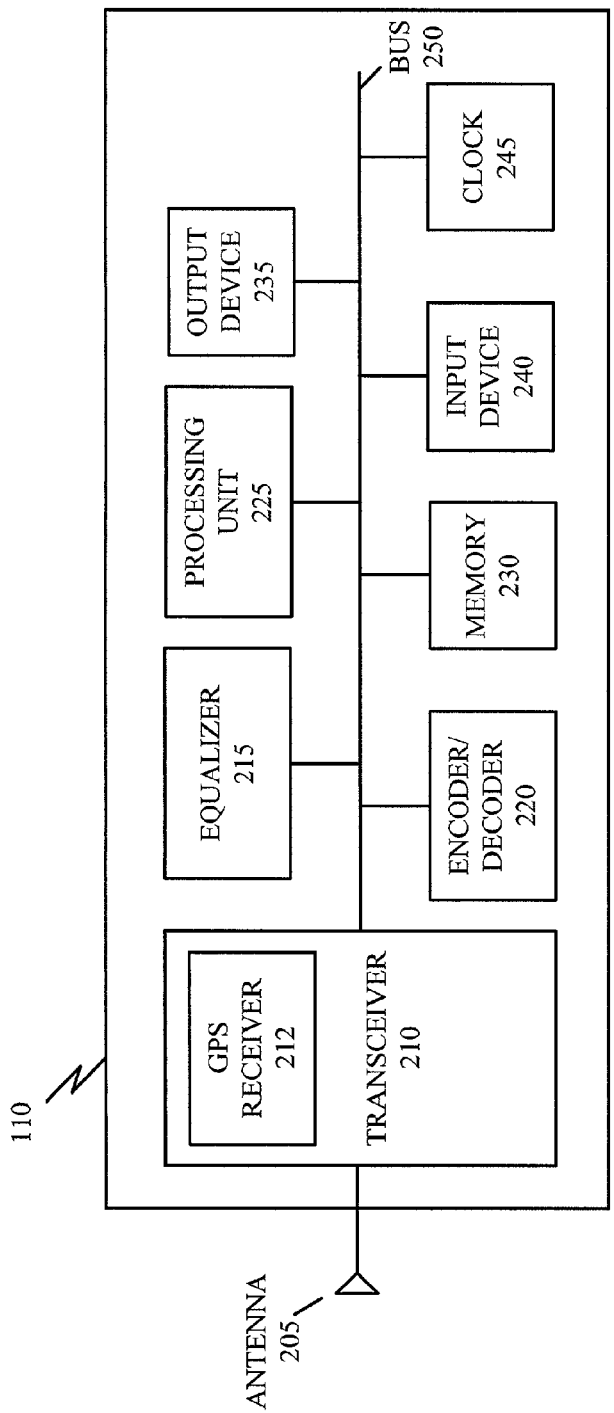
FIG. 2 illustrates an exemplary configuration of a mobile terminal consistent with the present invention.

FIG. 2 illustrates an exemplary configuration of mobile terminal 110 consistent with the present invention. As illustrated, the mobile terminal 110 may include an antenna 205, a transceiver 210, an equalizer 215, an encoder/decoder 220, a processing unit 225, a memory 230, an output device 235, an input device 240, a clock 245, and a bus 250.

The antenna 205 may include one or more conventional antennas capable of transmitting and receiving information. The transceiver 210 may include well-known transceiver circuitry for transmitting and/or receiving data bursts in a network, such as network 100, via the antenna 205. The transceiver 210 may also include a GPS receiver 212 that aids the mobile terminal 110 in determining its position within the network 100.

The equalizer 215 may include one or more conventional equalizers, such as a Viterbi equalizer, for removing intersymbol interference. The encoder/decoder 220 may include conventional circuitry for encoding and/or decoding received or transmitted symbol sequences.

The processing unit 225 may include any type of conventional processor or microprocessor that interprets and executes instructions. The processing unit 225 may perform all data processing functions for inputting, outputting, and processing of data. The memory 230 may provide permanent, semi-permanent, or temporary working storage of data and instructions for use by processing unit 225 in performing processing functions. Memory 230 may include large-capacity storage devices, such as a magnetic and/or optical recording medium and its corresponding drive.

The output device 235 may include one or more conventional mechanisms that output information to an operator, including a display, a printer, a speaker, etc. The input device 240 may include one or more conventional mechanisms that permit the operator to input information to the mobile terminal 110, such as a keypad, a mouse, a microphone, a pen, voice recognition and/or biometric mechanisms, etc. The output and input devices 235 and 240 may include additional devices (not shown) for converting received information from a first format into a second format.

The clock 245 may include conventional circuitry for tracking the timing of one or more control channels. The clock 245 may include, for example, one or more counters. The bus 250 may include one or more conventional buses that interconnect the various components of mobile terminal 110 to permit the components to communicate with one another.

The configuration of mobile terminal 110, shown in FIG. 2, is for provided for illustrative purposes only. One skilled in the art will recognize that other configurations may be employed. Moreover, one skilled in the art will appreciate that a typical mobile terminal 110 may include other devices that aid in the reception, transmission, or processing of data.

Typically, when the mobile terminal 110 is first powered up, it searches for control channels (e.g., DCCHs) on which to camp. After the mobile terminal 110 finds a satisfactory DCCH, the mobile terminal 110 may look for pointers to the EGPRS-136 control channels. If a pointer is found, the mobile terminal 110 may follow this pointer to an EGPRS-136 control channel.

When the mobile terminal 110 finds the EGPRS-136 control channel, it first attaches for packet data services and then tunnels a registration to the gateway MSC/VLR 145 via the SGSN 120 (i.e., the mobile terminal 110 transmits the registration to the circuit-switched part of network 100 while being attached for packet data services). This allows the MSC/VLR 145 to know how to reach the mobile terminal 110 in the event the mobile terminal 110 receives a page. At this point, the mobile terminal 110 is considered successfully camping on the EGPRS-136 packet control channel.

Once camped on the EGPRS-136 control channel, the mobile terminal 110 may receive pointers to available DCCHs that may be reached from this particular EGPRS-136 control channel in case the mobile terminal 110 wants to make a call or receives a page. The mobile terminal 110 may store these pointers in memory, such as memory 230, for later use. The mobile terminal 110 may also keep track of GPS time and time, in the form of various frame counters, time slot numbers, and symbol numbers, for a specific DCCH through the use of clock 245. The mobile terminal 110 may track the GPS time by using the DCCH time and a relationship between the DCCH time and the GPS time. This relationship may be included as part of the assistance data that, as will be described in more detail below, the mobile terminal 110 may acquire via a DCCH or via tunneling on an EGPRS-136 control channel. The mobile terminal may store the assistance data in memory 230. After acquiring the DCCH time and the GPS time to DCCH time relationship, the mobile terminal 110 may, for example, determine the GPS time by adding the difference between the current epoch and the epoch for which the GPS time to DCCH time relationship was provided to the GPS time.

The mobile terminal 110 may perform the above processing and the processing described below in response to the processing unit 225 executing sequences of instructions contained in a computer-readable medium, such as memory 230. It should be understood that a computer-readable medium may include one or more memory devices and/or carrier waves. The instructions may be read into memory 230 from another computer-readable medium or from a separate device via transceiver 210. Execution of the sequences of instructions contained in memory 230 causes processing unit 225 to perform the process steps that will be described hereafter. In alternative embodiments, hard-wired circuitry may be used in place of or in combination with software instructions to implement the present invention. Thus, the present invention is not limited to any specific combination of hardware circuitry and software.

Figure 3:
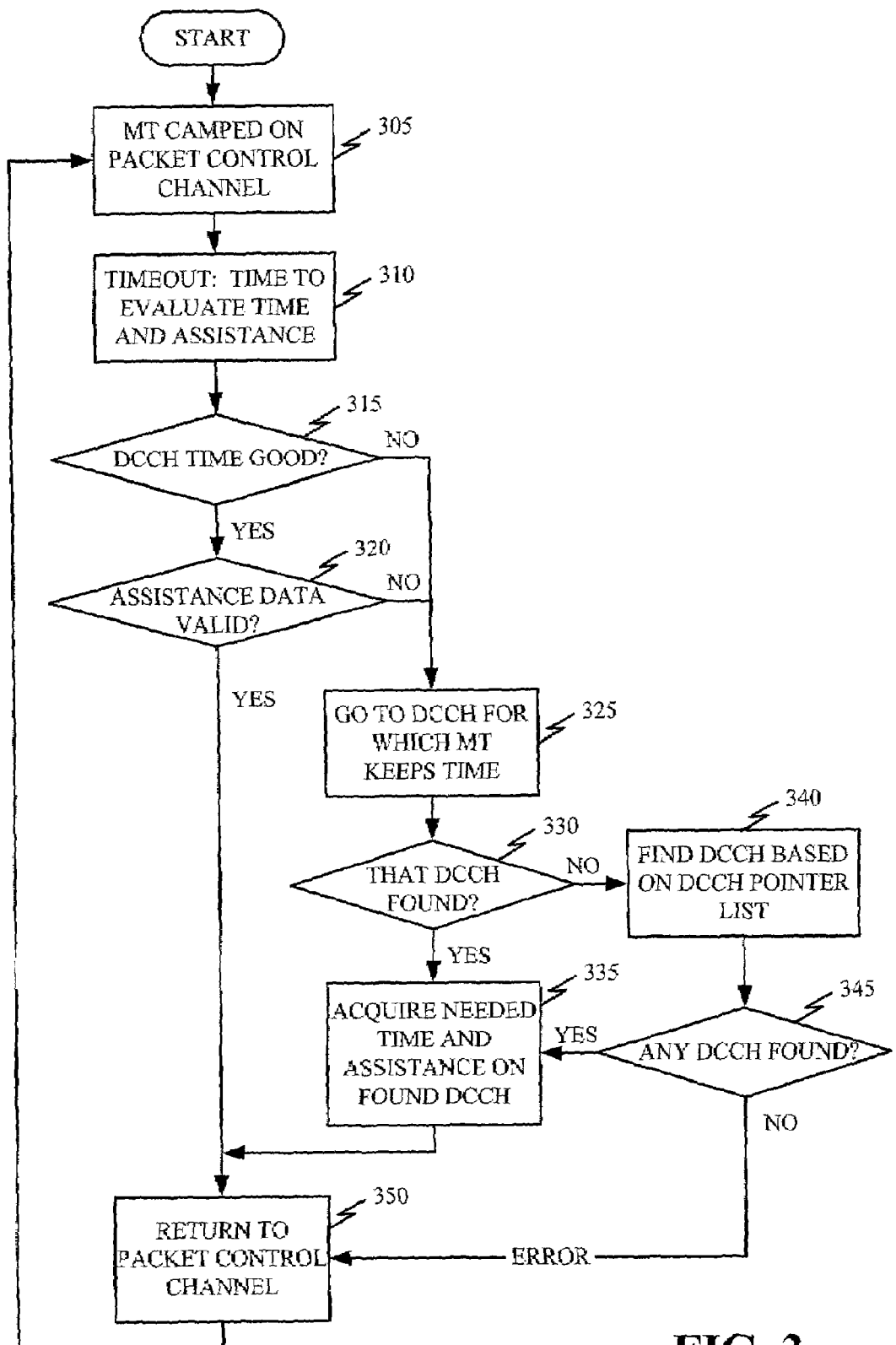
FIG. 3 illustrates an exemplary process, consistent with the present invention, for maintaining GPS time and assistance data in a mobile terminal camped on a packet control channel.

FIG. 3 illustrates an exemplary process, consistent with the present invention, for maintaining GPS time and assistance data in a mobile terminal, such as mobile terminal 110, camped on a packet control channel, such as an EGPRS-136 packet control channel. It is assumed that the mobile terminal 110 does not have access to the assistance data through tunneling.

Processing begins with the mobile terminal 110 camped on the packet control channel [step 305]. At predetermined timeout periods [step 310], the mobile terminal 110 may evaluate the DCCH time [step 315] and the stored assistance data [step 320] to determine whether this information is valid. Since the DCCH time and the mobile terminal's 110 clock 245 may drift at different rates, this timeout period allows the mobile terminal 110 to adjust its internal clock 245 to correspond to the DCCH time. The mobile terminal 110 may, for example, determine in steps 315 and 320 that the DCCH time and assistance data are no longer valid because the information is too old. Moreover, the mobile terminal 110 may determine that the assistance data is no longer valid for the area in which the mobile terminal 110 is located.

If the mobile terminal 110 determines that either the DCCH time or the assistance data is no longer valid, the mobile terminal 110 may suspend packet data services by, for example, transmitting a pause request and attempt to camp on the DCCH for which the mobile terminal 110 is keeping time (i.e., the preferred DCCH) [step 325]. If the DCCH can be found [step 330], the mobile terminal 110 may acquire the needed information from the DCCH [step 335]. When the DCCH time is needed, the mobile terminal 110 may measure time on the DCCH in a well-known manner. To measure time, the mobile terminal 110 may, for example, synchronize its clock 245 by synchronizing one or more internal counters (e.g., frame number, time slot number, bit number counters) to those values read on the DCCH. When the assistance data is no longer valid, the mobile terminal 110 may obtain the assistance data via broadcast messaging or point-to-point messaging.

When acquiring the assistance data via broadcast messaging, the mobile terminal 110 may determine the approximate time period when the assistance message (i.e., the message providing the assistance data) is transmitted on the DCCH based, for example, on prior retrievals of the assistance message from the same DCCH. For example, if the broadcast message for which the mobile terminal 110 is looking is on the extended broadcast channel (E-BCCH) of the DCCH, the assistance message may likely be part of a long set of messages that may have a duty cycle of many seconds. It may also be expected that this set of messages and this duty cycle remain the same over long periods of time (e.g., many hours). In this scenario, the mobile terminal 110 may use its knowledge of the location of the assistance message in this duty cycle from prior message retrievals to minimize the time that the mobile terminal is camping on the DCCH away from the packet control channel. The mobile terminal 110 may determine the slots on the DCCH that contain the GPS time to DCCH time relationship and other needed assistance data and switch to the DCCH in time to read the requisite slots and switch back to the packet control channel immediately afterwards.

As an alternative to receiving the assistance data via broadcast messaging, the mobile terminal 110 may send a request for the assistance data to the PDE 170, via the serving MSC/VLR 140. The mobile terminal 110 may send the request via one or more point-to-point messages. In response to receiving the request, the PDE 170 may send the mobile terminal 110 the assistance data in a point-to-point message on the preferred DCCH. As described above, the assistance data may contain the relationship between the GPS time and the DCCH time for the DCCH on which the mobile terminal 110 is communicating with the PDE 170. Since the mobile terminal 110 has knowledge of the DCCH time for the preferred DCCH while on the packet control channel, it is able to achieve synchronization on the preferred DCCH quickly. The time spent on the DCCH may then be determined by the response time of the PDE 170 in delivering the requested assistance data.

If the preferred DCCH cannot be found [step 330], the mobile terminal 110 may attempt to locate any of the other DCCHs included in the list of DCCHs to which the packet control channel points [step 340]. If a new DCCH can be located from the list [step 345], the mobile terminal 110 may switch to the new DCCH and read all of the information necessary to obtain DCCH and GPS times and get the latest assistance data [step 335]. The time for the new DCCH may then be maintained so that it becomes the preferred DCCH for future reference time updates.

If the DCCH time and assistance data are determined to be valid [steps 315 and 320, respectively] or once the mobile terminal 110 has acquired the necessary information from a DCCH [step 335], the mobile terminal 110 may return to the packet control channel [step 350]. If necessary, the mobile terminal 110 may determine the GPS time by, for example, adding the difference between the current epoch and the epoch for which the GPS time to DCCH time relationship was provided to the GPS time.

If no DCCH can be found [step 345], an error may occur and the mobile terminal 110 may return to the packet control channel [step 350]. In such an event, the mobile terminal 110 may not update the time and assistance data. Processing returns to step 305.

Figure 4:
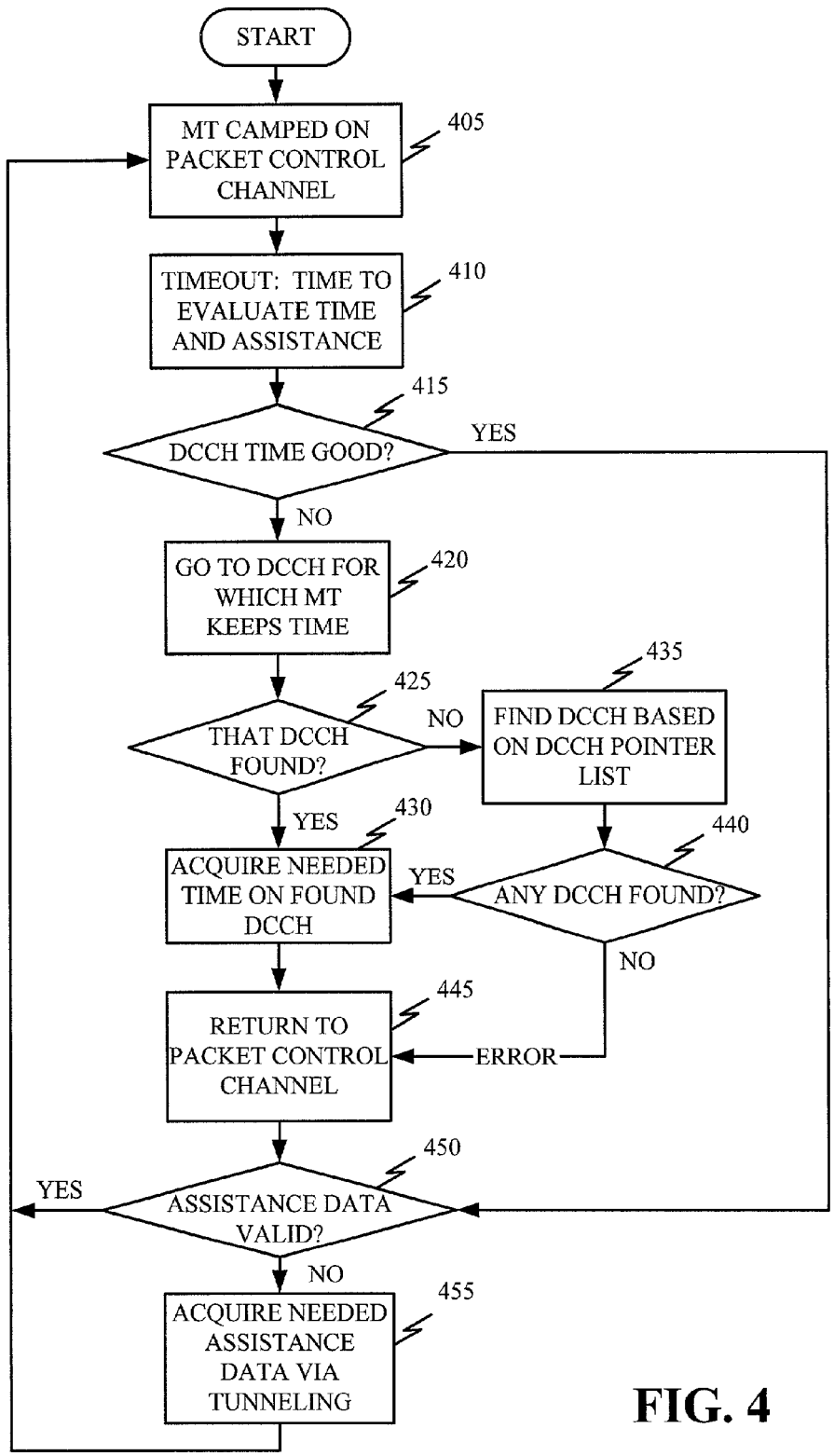
FIG. 4 illustrates an alternative exemplary process, consistent with the present invention, for maintaining GPS time and assistance data in a mobile terminal camped on a packet control channel.

FIG. 4 illustrates an alternative exemplary process, consistent with the present invention, for maintaining GPS time and assistance data in a mobile terminal, such as mobile terminal 110, camped on a packet control channel. For this process, it is assumed that the mobile terminal 110 may access the assistance data through tunneling.

Processing begins with the mobile terminal 110 camped on the packet control channel [step 405]. As described above, the packet control channel is assumed to be an EGPRS-136 control channel. At predetermined timeout periods [step 410], the mobile terminal 110 may evaluate the DCCH time [step 415] and the assistance data [step 450] to determine whether this information is valid. The mobile terminal 110 may, for example, determine that this information is too old or is no longer valid for the area in which the mobile terminal 110 is located.

If the mobile terminal 110 determines that the DCCH time is no longer good, the mobile terminal 110 may suspend packet data services and attempt to camp on the DCCH for which it is keeping time (i.e., the preferred DCCH) [step 420]. If the preferred DCCH can be found, the mobile terminal 110 may switch to the preferred DCCH. The mobile terminal 110 may then acquire the needed time by synchronizing its DCCH clock 245 on the DCCH [step 430]. The mobile terminal 110 may, for example, synchronize its clock 245 by synchronizing one or more counters (e.g., frame number, time slot number, bit number counters) to those values read on the DCCH.

If the mobile terminal 110 cannot find the preferred DCCH [step 425], the mobile terminal 110 may attempt to locate any of the other DCCHs included in the list of DCCHs to which the packet control channel points [step 435]. If a new DCCH can be located from the list [step 440], the mobile terminal 110 may switch to the new DCCH and acquire the needed time on the new DCCH [step 430]. The time for the new DCCH may then be maintained so that is becomes the preferred DCCH for future reference time updates.

Once the mobile terminal 110 has acquired the DCCH time from a DCCH [step 430], the mobile terminal 110 may return to the packet control channel [step 445]. The mobile terminal 110 may also return to the packet control channel [step 445] when no DCCH can be found [step 440]. In such an event, the mobile terminal 110 may not update the time.

If, on the other hand, the mobile terminal 110 determines that the DCCH time is good [step 415] or after the mobile terminal 110 has returned to the packet control channel [step 445], the mobile terminal 110 may determine whether the assistance data is valid [step 450]. If the assistance data is determined to be invalid, the mobile terminal may acquire any needed assistance data through tunneling [step 455]. To acquire the assistance data, the mobile terminal 110 may transmit a request for the assistance data to the PDE 170. In the request, the mobile terminal 110 specifies the preferred DCCH. The PDE 170 responds to the assistance data request by providing, for example, the relationship of GPS time to the time for the preferred DCCH. The PDE 170 may also provide other requested assistance data.

Once the time and assistance data have been acquired, the mobile terminal 110 may determine the GPS time by, for example, adding the difference between the current epoch and the epoch for which the GPS time to DCCH time relationship was provided to the GPS time. Processing returns to step 405.

Figure 5:
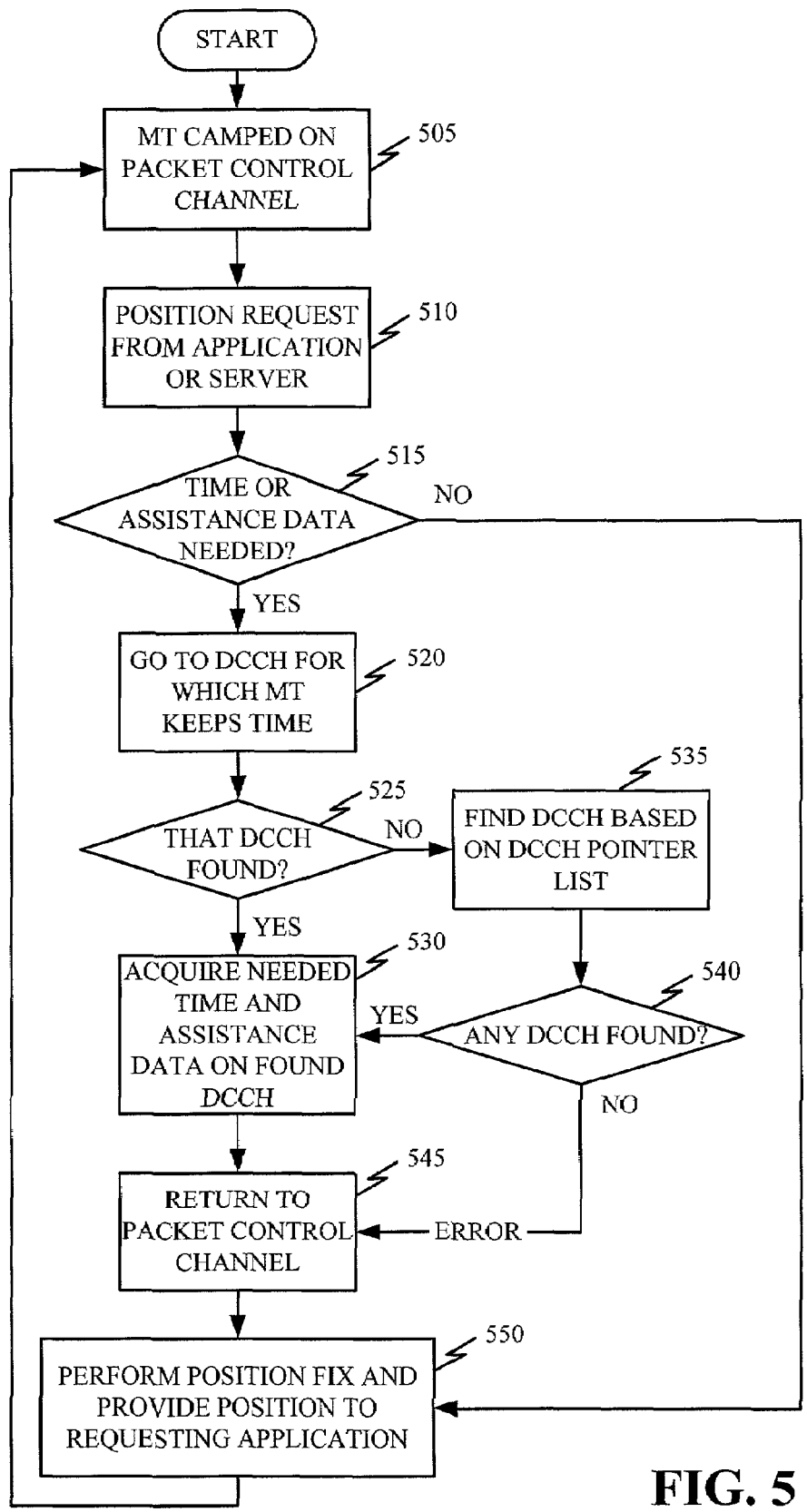
FIG. 5 illustrates an exemplary process, consistent with the present invention, by which a mobile terminal responds to a position request while camped on a packet control channel.

FIG. 5 illustrates an exemplary process, consistent with the present invention, by which a mobile terminal, such as mobile terminal 110, responds to a position request while camped on a packet control channel, such as an EGPRS-136 packet control channel. For this process, it is assumed that the mobile terminal 110 does not have access to the assistance data through tunneling.

Processing begins with the mobile terminal 110 camped on the packet control channel [step 505]. During the time when the mobile terminal 110 is camped on the packet control channel, the mobile terminal 110 may receive a position request message [step 510]. The position request message may, for example, originate from an application running on the mobile terminal 110 or from another device, such as MPC/SCP 160 or PDE 170.

In response to receiving the positioning request, the mobile terminal 110 may determine whether its time or assistance data needs updating [step 515]. The time and assistance data may, for example, require updating if the mobile terminal 110 has not recently updated the information. Similarly, the mobile terminal 110 may determine that the assistance data is no longer valid due to a change in the area in which the mobile terminal 110 is located.

If the mobile terminal 110 determines that time or assistance data is needed, the mobile terminal 110 may suspend packet data services and attempt to camp on the DCCH for which it is keeping time (i.e., the preferred DCCH) [step 520]. If the preferred DCCH can be found [step 525], the mobile terminal 110 may switch to the preferred DCCH. The mobile terminal 110 may then acquire the needed time and/or assistance data from the DCCH [step 530].

To acquire the DCCH time, the mobile terminal 110 may read various counters that are broadcast on the DCCH (e.g., frame number, time slot number, bit number, etc.) and synchronize internal counters to those broadcast counters. When the assistance data is no longer valid, the mobile terminal 110 may acquire this information, as described above with respect to FIG. 3, via broadcast messaging or point-to-point messaging. The mobile terminal 110 may, for example, use knowledge of prior assistance data retrievals to minimize the time that the mobile terminal is camping on the DCCH away from the packet control channel. The mobile terminal 110 may determine the slots on the DCCH that contain the desired assistance data (e.g., the GPS time to DCCH time relationship) and use this information to switch to the DCCH in time to read the requisite slots and switch back to the packet control channel immediately thereafter.

If the mobile terminal 110 cannot find the preferred DCCH [step 525], the mobile terminal 110 may attempt to locate any of the other DCCHs included in the list of DCCHs to which the packet control channel points [step 535]. If a new DCCH can be located from the list [step 540], the mobile terminal 110 may switch to the new DCCH and read all of the information necessary to obtain DCCH and GPS times [step 530]. The time for the new DCCH may then be maintained so that is becomes the preferred DCCH for future reference time updates.

Once the mobile terminal 110 has acquired the necessary information from a DCCH [step 530], the mobile terminal 110 may return to the packet control channel [step 545]. After returning to the packet control channel, the mobile terminal 110 may use the acquired information to determine its position in a conventional manner [step 550]. The mobile terminal 110 may, for example, estimate its position by synchronizing to signals received from multiple satellites, determining the position of the satellites, and using the received times of arrival (TOAs) to determine its own position. The mobile terminal 110 may determine the position of the satellites at the time of the measurements by using the Almanac, the Ephemeris, and the current GPS time. Once determined, the mobile terminal 110 may provide this position information to the requesting application or device.

If, in step 540 no DCCH can be found, an error situation may arise. The mobile terminal 110 may return to the packet control channel [step 545] and notify the requesting application or device of the error or provide a best effort position fix based on old (i.e., previous stored) data. Processing then returns to step 505.

Figure 6:
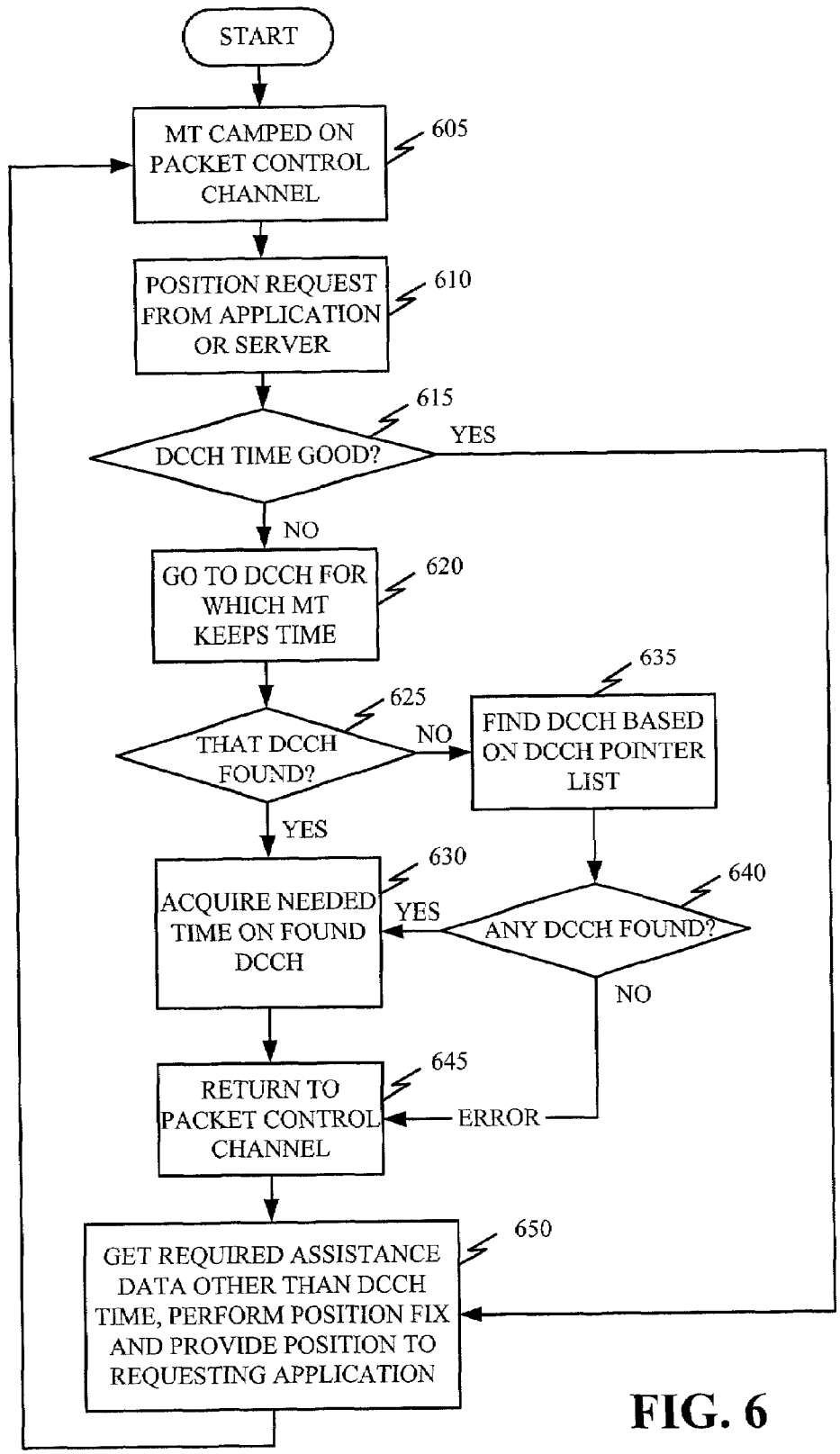
FIG. 6 illustrates an alternative exemplary process, consistent with the present invention, by which a mobile terminal responds to a position request while camped on a packet control channel.

FIG. 6 illustrates an alternative exemplary process, consistent with the present invention, by which a mobile terminal, such as mobile terminal 110, responds to a position request while camped on a packet control channel, such as an EGPRS-136 control channel. For this process, it is assumed that the mobile terminal 110 has access to the assistance data through tunneling.

Processing begins with the mobile terminal 110 camped on the packet control channel [step 605]. During the time when the mobile terminal 110 is camped on the packet control channel, the mobile terminal 110 may receive a position request message [step 610]. The positioning request message may, for example, originate from an application running on the mobile terminal 110 or from another device, such as MPC/SCP 160 or PDE 170.

In response to receiving the positioning request, the mobile terminal 110 may determine whether its DCCH time is good [step 615]. The DCCH time may require updating, for example, if the mobile terminal 110 has not recently measured DCCH time.

If the mobile terminal 110 determines that the DCCH time is needed [step 615], the mobile terminal 110 may suspend packet data services and attempt to camp on the DCCH for which it is keeping time (i.e., the preferred DCCH) [step 620]. If the preferred DCCH can be found [step 625], the mobile terminal 110 may switch to the preferred DCCH. The mobile terminal 110 may then acquire the needed time from the DCCH by, for example, reading the various counters that are broadcast on the DCCH and synchronizing internal counters to those broadcast counters [step 630].

If the mobile terminal 110 cannot find the preferred DCCH [step 625], the mobile terminal 110 may attempt to locate any of the other DCCHs included in the list of DCCHs to which the packet control channel points [step 635]. If a new DCCH can be located from the list [step 640], the mobile terminal 110 may switch to the new DCCH and measure time on this new DCCH [step 630]. The time for the new DCCH may then be maintained so that is becomes the preferred DCCH for future reference time updates.

Once the mobile terminal 110 has acquired the DCCH time from a DCCH [step 630], the mobile terminal 110 may return to the packet control channel [step 645]. After returning to the packet control channel, the mobile terminal 110 may acquire any assistance data needed to determine its position [step 650]. The mobile terminal 110 may acquire this needed assistance data via tunneling.

If, for example, assistance data that needs precise GPS time, such as acquisition assistance (e.g., code phases and Doppler frequencies of visible satellites), is needed, the mobile terminal 110 may determine the GPS time by requesting the GPS time to DCCH time relationship for the preferred DCCH. If, on the other hand, the assistance data needed does not need precise time, but only coarse time, such as Ephemeris and Almanac, the mobile terminal 110 may request these pieces of data via tunneling. The mobile terminal 110 may, for example, transmit a request for the needed assistance data, via the packet control channel, to the PDE 170. The PDE 170 may provide the requested assistance data.

The mobile terminal 110 may use the acquired assistance data to determine its position in a well-known manner [step 650]. The mobile terminal 110 may, for example, estimate its position by synchronizing to signals received from multiple satellites, determining the position of the satellites, and using the received times of arrival (TOAs) to determine its own position. The mobile terminal 110 may determine the position of the satellites at the time of the measurements by using the Almanac, the Ephemeris, and the current GPS time. Once determined, the mobile terminal 110 may provide the determined location information to the requesting application or device.

If, in step 640 no DCCH can be found, an error situation may arise. The mobile terminal 110 may return to the packet control channel [step 645] and notify the requesting application or device of the error or provide a best effort position fix based on old data. Processing then returns to step 605.

Figure 7:
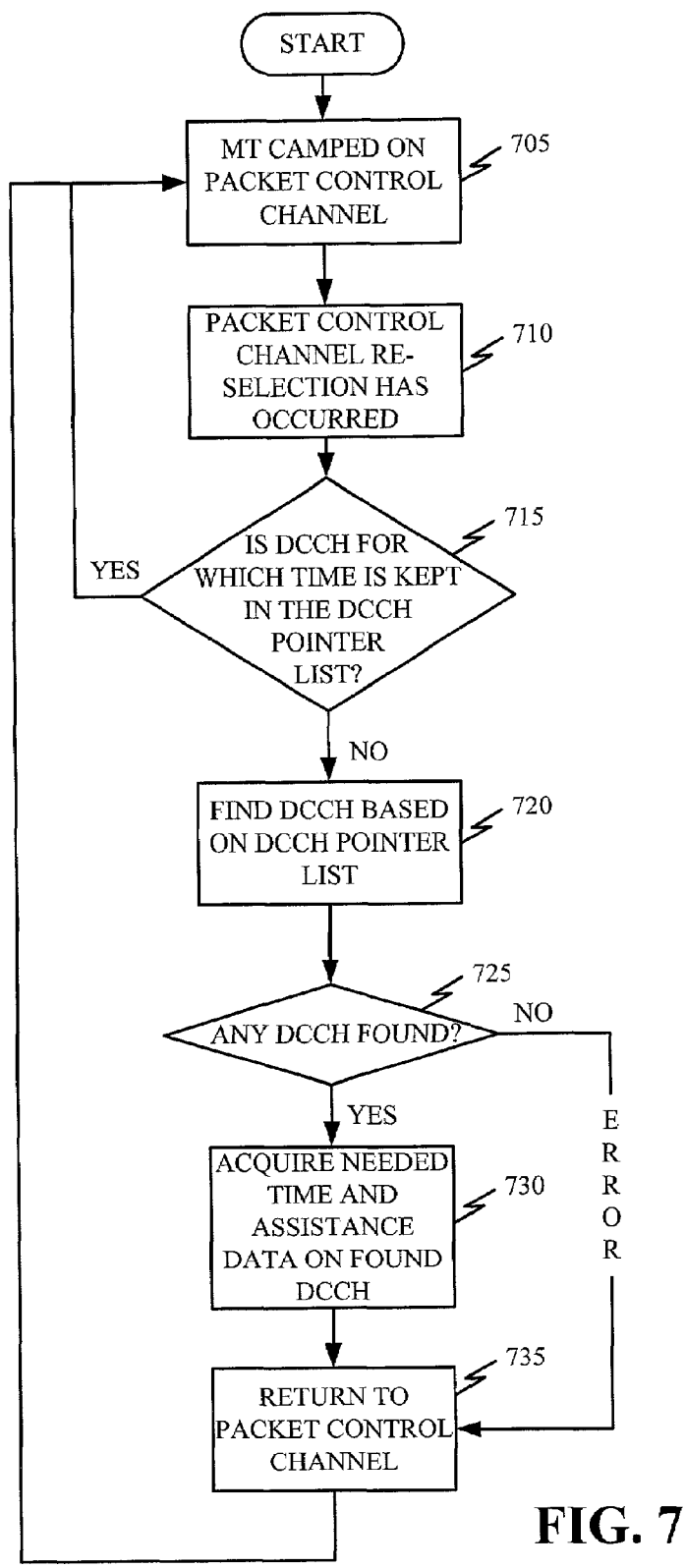
FIG. 7 illustrates an exemplary packet control channel reselection process consistent with the present invention.

FIG. 7 illustrates an exemplary packet control channel reselection process consistent with the present invention. Processing begins with a mobile terminal, such as mobile terminal 110, camped on a packet control channel, such as an EGPRS-136 packet control channel [step 705].

During the time when the mobile terminal 110 is camped on the packet control channel, the mobile terminal 110 may perform a packet control channel reselection operation in which the mobile terminal 110 switches from one packet control channel to another [step 710]. This reselection process may occur, for example, as a result of the mobile terminal 110 being moved to a new location.

When this occurs, the mobile terminal 110 may determine if the DCCH for which it keeps time (i.e., the preferred DCCH) is included in the list of DCCHs to which the new packet control channel points [step 715]. If the preferred DCCH is included in the list, the mobile terminal 110 may return to camping on the new packet control channel [step 705].

If, on the other hand, the preferred DCCH is not included in the list, the mobile terminal 110 may suspend packet data services and attempt to find a DCCH based on the DCCH pointer list [step 720]. If a DCCH can be found [step 725], the mobile terminal 110 may switch to the found DCCH. This DCCH may become the mobile terminal's 110 preferred DCCH. The mobile terminal 110 may then acquire any needed time and assistance data from the DCCH in a manner similar to the techniques described above [step 730].

Once the time and assistance data has been acquired from the new DCCH [step 730], the mobile terminal 110 may return to the new packet control channel [step 735]. If, in step 725 no DCCH can be found, an error situation may arise. The mobile terminal 110 may return to the packet control channel [step 735] without updating the time and assistance data. Processing then returns to step 705.

Figure 8A:
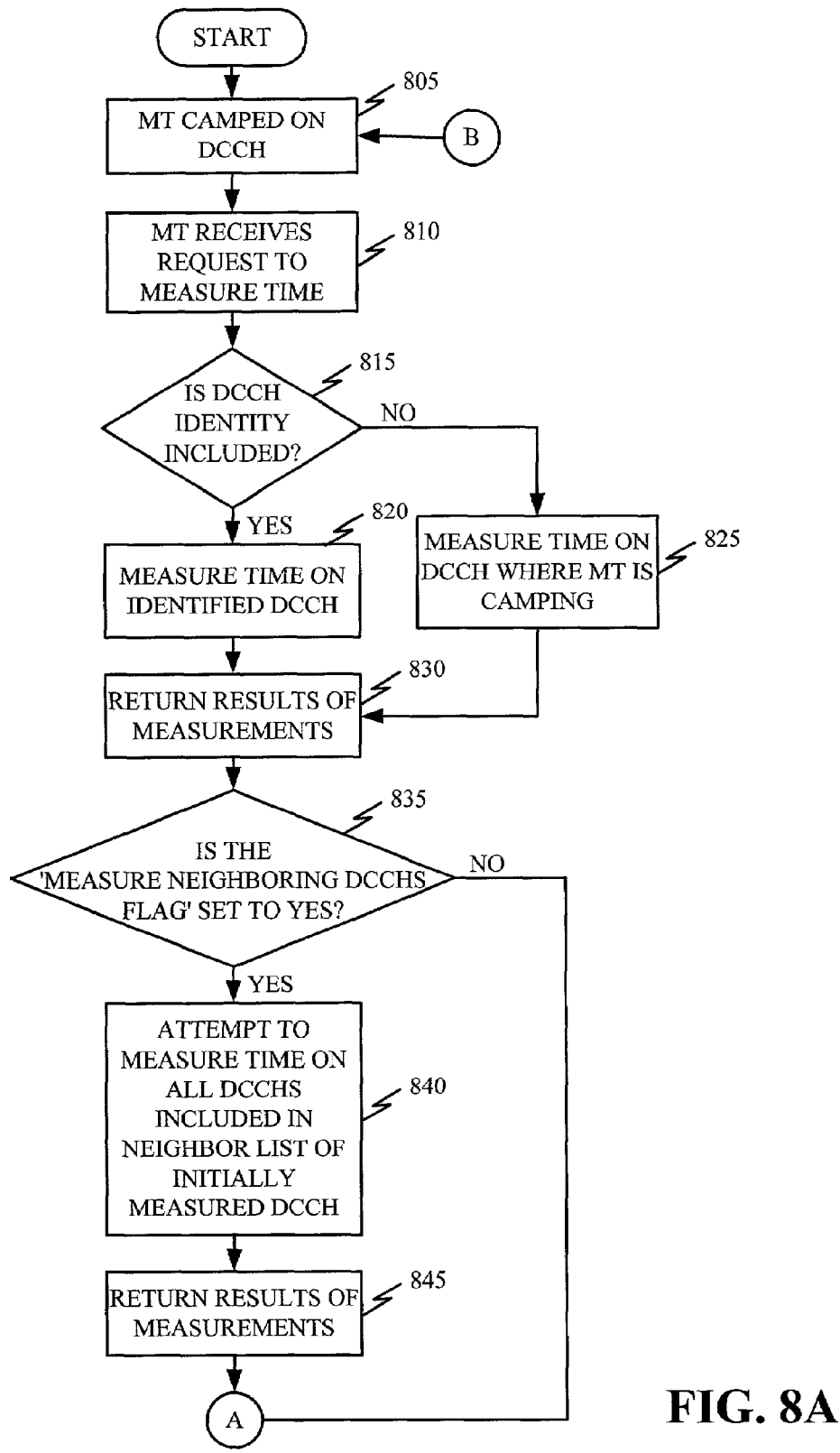
FIGS. 8A and 8B illustrate exemplary processing, consistent with the present invention, by which a mobile terminal measures time on circuit-switched and packet air interfaces.
Figure 8B:
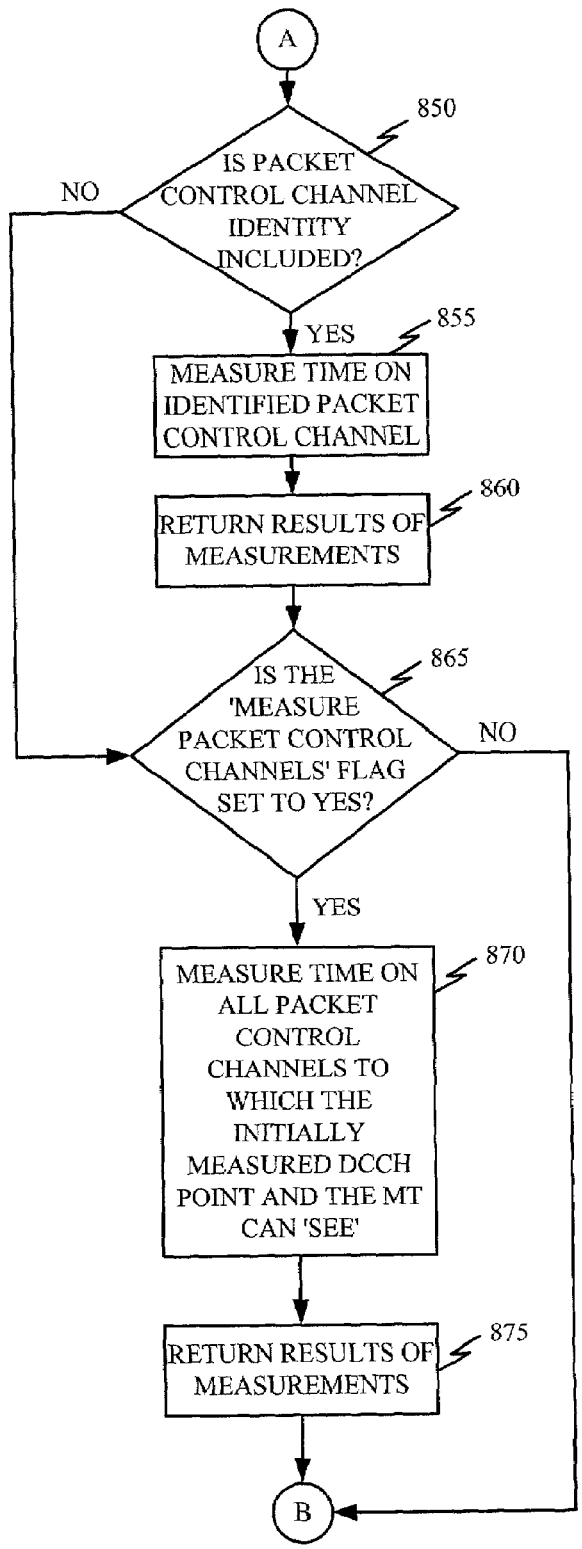

FIGS. 8A and 8B illustrate exemplary processing, consistent with the present invention, by which a mobile terminal, such as mobile terminal 110, measures time on circuit-switched (e.g., TDMA) and packet (e.g., EGPRS-136) air interfaces. The mobile terminal 110 may, according to an exemplary implementation consistent with the present invention, be implemented as a dedicated, tri-mode, location measurement unit (LMU) that is capable of measuring time on GPS, circuit-switched, and packet air interfaces.

Processing begins with the mobile terminal 110 camped on a circuit-switched control channel, such as a DCCH [step 805]. While camping, the mobile terminal 110 may receive a request to measure time [step 810]. The mobile terminal 110 may receive the request from an application running on the mobile terminal 110 or from another device in the network, such as MPC/SCP 160 or PDE 170. The request may include an identifier indicating that time is to be measured on a particular DCCH. The request may also include one or more flags indicating that time is to be measured on all DCCHs, a particular packet control channel (e.g., EGPRS-136 control channels), and/or all packet control channels.

In response to the request, the mobile terminal 110 may determine whether the request includes a DCCH identity [step 815]. If the request includes a DCCH identity, the mobile terminal 110 may switch to the identified DCCH and measure time on the DCCH [step 820]. The mobile terminal 110 may measure the time on the identified DCCH by reading various counters broadcast on the identified DCCH (e.g., frame number, time slot number, bit number, etc.) and synchronizing internal counters to those broadcast counters. If, on the other hand, the request does not include a DCCH identity, the mobile terminal 110 may measure time on the DCCH where the mobile terminal 110 is currently camping [step 825]. After measuring the time on the identified DCCH [step 820] or on the DCCH where the mobile terminal 110 is camping [step 825], the mobile terminal 110 may return the results of the measurement to the requesting application or device [step 830].

The mobile terminal 110 may then determine whether the request includes a flag indicating that all DCCHs are to be measured [step 835]. If the flag indicates that all DCCHs are to be measured, the mobile terminal 110 may attempt to switch to the DCCHs included in a neighbor list of the initially-measured DCCH and measure the time on each DCCH [step 840]. The mobile terminal 110 may measure time on the various DCCHs by reading the various counters that are broadcast on those channels (e.g., frame number, time slot number, bit number, etc.) and synchronizing internal counters to those broadcast counters. Once the mobile terminal 110 has measured time on all of the DCCHs, the mobile terminal 110 may return the results of the measurements to the requesting application or device [step 845].

The mobile terminal 110 may then determine whether the request includes a packet control channel identity [step 850] (FIG. 8B). If the request includes a packet control channel identity, the mobile terminal 110 may switch to the identified packet control channel and measure the time on the identified packet control channel [step 855].

Similar to the DCCH, the packet control channels may periodically broadcast frame counters, such as a frame number, time slot number, and bit number. The mobile terminal 110 may measure time on the identified packet control channel by reading the various counters that are broadcast on that channel and synchronizing internal counters to those broadcast counters. Once the mobile terminal 110 has measured time on the identified packet control channel, the mobile terminal 110 may return the results of the measurements to the requesting application or device [step 860].

If the request does not include a packet control channel identity [step 850] or once the mobile terminal 110 has measured the time on an identified packet control channel [step 860], the mobile terminal 110 may determine whether the request includes a flag indicating that timing on all packet control channels are to be measured [step 865]. If the flag indicates that timing on all packet control channels are to be measured, the mobile terminal 110 may switch to each of the packet control channels to which the initially-measured DCCH points and measure the time on each packet control channel [step 870]. The mobile terminal 110 may also switch to and measure the time on any other packet control channels to which the mobile terminal 110 has access. Once the mobile terminal 110 has measured time on all of the packet control channels, the mobile terminal 110 may return the results of the measurements to the requesting application or device [step 875]. The mobile terminal 110 may then return to camping on the DCCH [step 805].

The mobile terminal 110 may, prior to returning the results of the measurements taken with respect to the identified DCCH, all DCCHs, an identified packet control channel, and all packet control channels, determine a relationship between the GPS time and the time on the individual channels. For the packet control channels, for example, the mobile terminal 110 may measure the GPS time in a well-known manner and relate this time to the frame number, time slot number, and bit number values read at the time the GPS time was measured. These relationships may then be forwarded to the requesting application or device. It will be appreciated that relationships between the measured DCCHs and packet control channels may alternatively be determined via another network device, such as PDE 170.

Figure 9A:
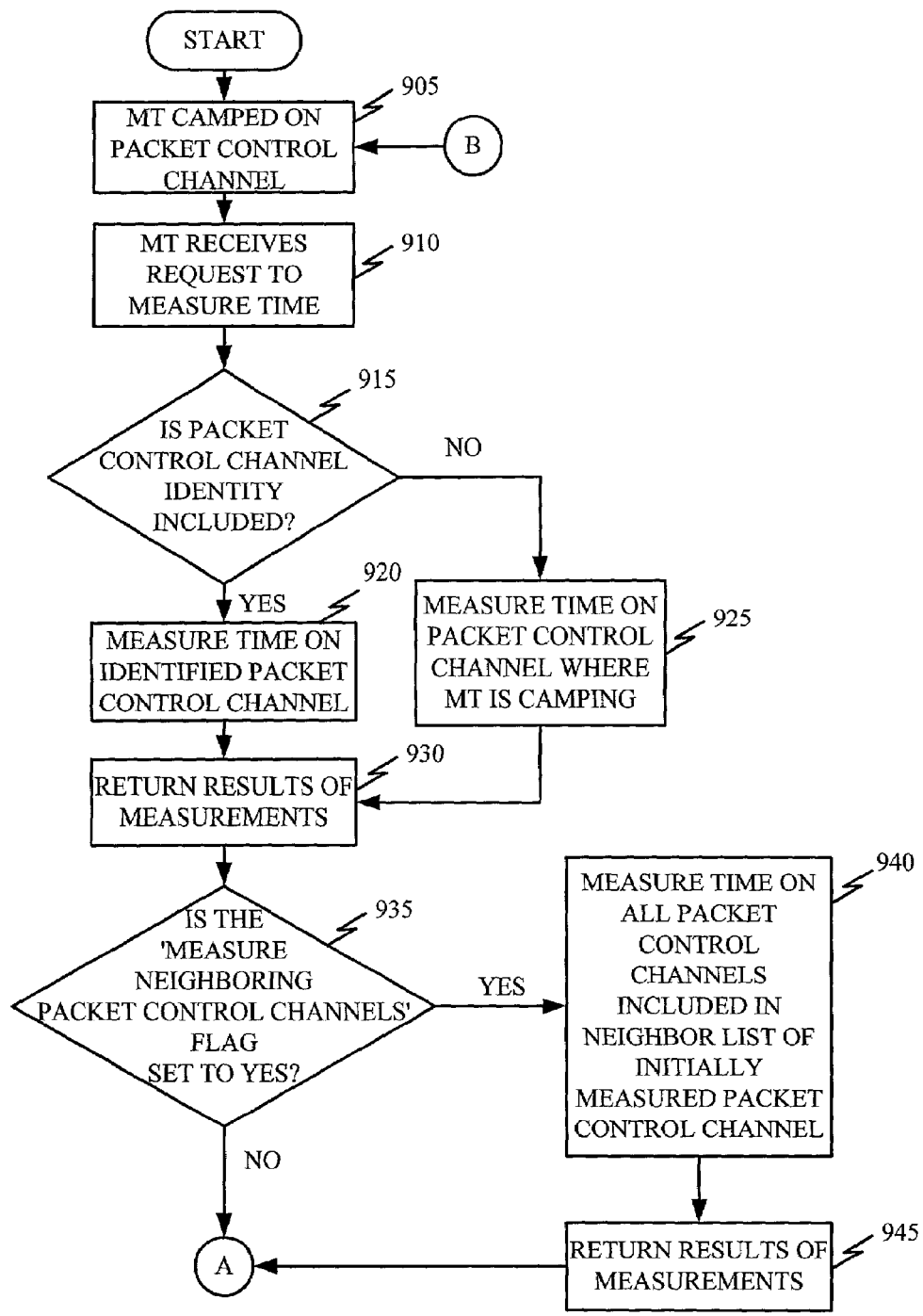
FIGS. 9A and 9B illustrate alternative exemplary processing, consistent with the present invention, by which a mobile terminal measures time on circuit-switched and packet air interfaces.
Figure 9B:
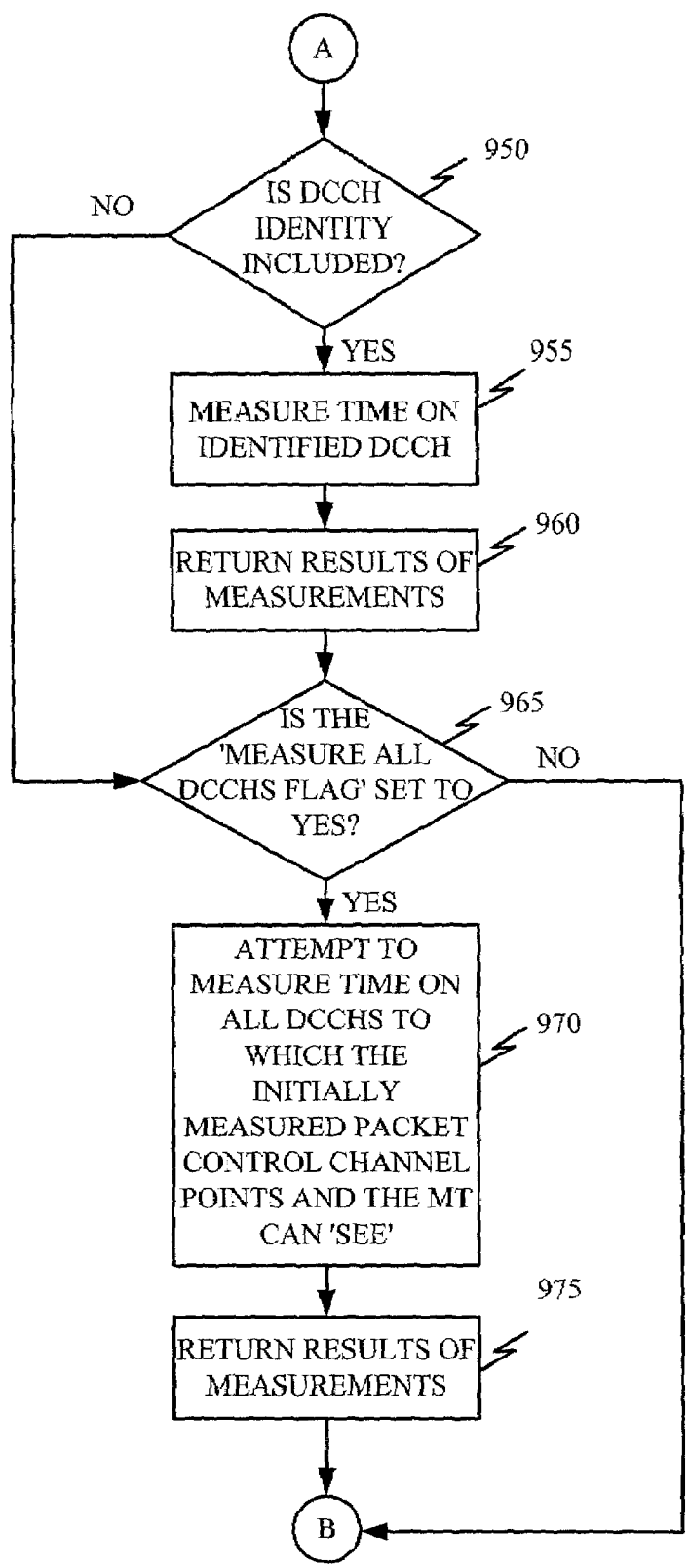

FIGS. 9A and 9B illustrate alternative exemplary processing, consistent with the present invention, by which a mobile terminal, such as mobile terminal 110, measures time on circuit-switched (e.g., TDMA) and packet (e.g., EGPRS-136) air interfaces. The mobile terminal 110 may, according to an exemplary implementation consistent with the present invention, be implemented as a dedicated, tri-mode, location measurement unit (LMU) that is capable of measuring time on GPS, circuit-switched, and packet air interfaces.

Processing begins with the mobile terminal 110 camped on a packet control channel, such as an EGPRS-136 control channel [step 905]. While camping, the mobile terminal 110 may receive a request to measure time [step 910]. The mobile terminal 110 may receive the request from an application running on the mobile terminal 110 or from another device in the network, such as MPC/SCP 160 or PDE 170. The request may include an identifier indicating that time is to be measured on a particular packet control channel. The request may also include one or more flags indicating that time is to be measured on all packet control channels, a particular circuit-switched control channel (e.g., a DCCH), and/or all circuit-switched control channels.

In response to the request, the mobile terminal 110 may determine whether the request includes a packet control channel identity [step 915]. If the request includes a packet control channel identity, the mobile terminal 110 may switch to the identified packet control channel and measure time on the packet control channel [step 920]. The mobile terminal 110 may measure time on the identified packet control channel by, for example, reading various counters (e.g., frame number, time slot number, bit number, etc.) that are broadcast on the control channel and synchronizing internal counters to those broadcast counters. If, on the other hand, the request does not include a packet control channel identity, the mobile terminal 110 may measure time on the packet control channel where the mobile terminal 110 is currently camping [step 925]. After measuring time on the identified packet control channel [step 920] or on the packet control channel where the mobile terminal 110 is camping [step 925], the mobile terminal 110 may return the results of the measurement to the requesting application or device [step 930].

The mobile terminal 110 may then determine whether the request includes a flag indicating that all packet control channel are to be measured [step 935]. If the flag indicates that all packet control channels are to be measured, the mobile terminal 110 may attempt to switch to the packet control channels included in a neighbor list of the initially-measured packet control channel and measure time on each packet control channel [step 940]. As indicated above, the mobile terminal 110 may measure time on the various packet control channels by reading the various counters that are broadcast on those channels (e.g., frame number, time slot number, bit number, etc.) and synchronizing internal counters to those broadcast counters. Once the mobile terminal 110 has measured time on all of the packet control channels, the mobile terminal 110 may return the results of the measurements to the requesting application or device [step 945].

The mobile terminal 110 may then determine whether the request includes a DCCH identity [step 950] (FIG. 9B). If the request includes a DCCH identity, the mobile terminal 110 may switch to the identified DCCH and measure time on the identified DCCH [step 955].

Similar to the packet control channel, the DCCHs may periodically broadcast frame counters, such as a frame number, time slot number, and bit number. The mobile terminal 110 may measure time on the identified DCCH by reading the various counters that are broadcast on that channel and synchronizing internal counters to those broadcast counters. Once the mobile terminal 110 has measured time on the identified DCCH, the mobile terminal 110 may return the results of the measurements to the requesting application or device [step 960].

If the request does not include a DCCH identity [step 950] or once the mobile terminal 110 has measured the time on an identified DCCH [step 960], the mobile terminal 110 may determine whether the request includes a flag indicating that timing on all DCCHs is to be measured [step 965]. If the flag indicates that timing on all DCCHs are to be measured, the mobile terminal 110 may switch to each of the DCCHs to which the initially-measured packet control channel points and measure time on each DCCH [step 970]. The mobile terminal 110 may also switch to and measure the time on any other DCCH to which the mobile terminal 110 has access. Once the mobile terminal 110 has measured time on all of the DCCHs, the mobile terminal 110 may return the results of the measurements to the requesting application or device [step 975]. The mobile terminal 110 may then return to camping on the packet control channel [step 905].

The mobile terminal 110 may, prior to returning the results of the measurements taken with respect to the identified packet control channel, all packet control channels, the identified DCCH, and all DCCHs, determine a relationship between the GPS time and the time on the individual channels. For the packet control channels, for example, the mobile terminal 110 may measure the GPS time in a well-known manner and relate this time to the frame number, time slot number, and bit number values read at the time the GPS time was measured. These relationships may then be forwarded to the requesting application or device. It will be appreciated that relationships between the measured DCCHs and packet control channels may alternatively be determined via another network device, such as PDE 170.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Additionally, the present invention has been described in the context of a mobile terminal. The present invention, however, may be implemented in other devices or systems in a communication network. Also, while series of steps have been described with regard to FIGS. 3–9B, the order of the steps may be varied in other implementations consistent with the present invention. No element, step, or instruction used in the description of the present application should be construed as critical or essential to the invention unless explicitly described as such.

The present invention was described in the context of circuit-switched control channels (i.e., non-packet control channels) and packet control channels. It will be appreciated that implementations, consistent with the present invention, are equally applicable to any environment having control channels whose relationship to GPS time is not available and control channels whose relationship to GPS time is available.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may include any medium that can contain, store, communicate, propagate, or transport the program for use by, or in connection with, the instruction execution system, apparatus, or device. The computer-usable or computer-readable medium may include, for example, but not limited to, an electronic, magnetic, optical, electromagnetic, infrared, or semiconductor system, apparatus, device, or propagation medium.

More specific examples (a non-exhaustive list) of a computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Additionally, the present invention is described herein in the context of an EGPRS-136 cellular communications system. While the present invention may be particularly useful for improving the performance of EGPRS-136 cellular networks, it should be understood that the principles of the present invention may be applied to any cellular or wireless system utilizing other air interfaces. It should be further understood that the principles of the present invention may be utilized in hybrid systems that are combinations of two or more conventional air interfaces. In addition, a mobile terminal, in accordance with the present invention, may be designed to communicate with a base station transceiver using any standard based on GSM, TDMA, CDMA, FDMA, a hybrid of such standards or any other standard.

The scope of the invention is defined by the claims and their equivalents.

What is claimed is:

1. A device in a wireless communication network, comprising:

a memory that stores instructions and a Global Positioning System (GPS) time; and a processor that executes the instructions to:

receive a request to measure time, the request comprising at least one of a first control channel identity, the first control channel being a channel from which GPS assistance data is available, a first flag indicating that one or more other first control channels are to be measured, a second control channel identity, the second control channel being a channel from which GPS assistance data is unavailable, and a second flag indicating that at least one other second control channel is to be measured, read, when the request comprises a first control channel identity, time information on the identified first control channel, switch to each of the one or more other first control channels when the request comprises the first flag, read, after switching to a respective other first control channel, time information on the other first control channel, switch to the identified second control channel when the request comprises a second control channel identity, read, after switching to the identified second control channel, time information on the identified second control channel, switch to each of the at least one other second control channel when the request comprises the second flag, read, after switching to a respective other second control channel, time information on the other second control channel, and determine a relationship between the GPS time and the time information read from the identified first control channel, the one or more other first control channels, the identified second channel, and the at least one other second control channel.

2. The device of claim 1 wherein the request comprises a third flag indicating that a GPS time is to be determined,
wherein the processor determines a new GPS time in response to the request comprising the third flag, and
wherein, when determining a relationship between the GPS time and the time information read from the identified first control channel, the one or more other first control channels, the identified second control channel, and the at least one other second control channel, the processor determines a relationship between the new GPS time and the time information read from the identified first control channel, the one or more other first control channels, the identified second control channel, and the at least one other second control channel.

3. A method for measuring time in a wireless communication network, comprising:
receiving a request to measure time, the request comprising one or more of a first control channel identity, the first control channel being a channel from which Global Positioning System (GPS) assistance data is available, a first flag indicating that one or more other first control channels are to be measured, a second control channel identity, the second control channel being a channel from which GPS assistance data is unavailable, and a second flag indicating that at least one other second control channel is to be measured;
reading, when the request comprises a first control channel identity, time information on the identified first control channel;
switching to each of the one or more other first control channels when the request comprises the first flag;
reading, after switching to a respective other first control channel, time information on the respective other first control channel;
switching to the identified second control channel when the request comprises a second control channel identity;
reading, after switching to the identified second control channel, time information on the identified second control channel;
switching to each of the at least one other second control channel when the request comprises the second flag;
reading, after switching to a respective other second control channel, time information on the other second control channel;
determining a relationship between the time read on each of the identified first control channel, the one or more other first control channels, the identified second control channel, and the at least one other second control channel and a Global Positioning System (GPS) time; and
transmitting the relationships.

4. The method of claim 3 wherein the request comprises a third flag indicating that GPS time is to be measured, and wherein the method further comprises:
determining a new GPS time.

5. The method of claim 4 wherein the determining a relationship between the time read on each of the identified first control channel, the one or more other first control channels, the identified second control channel, and the at least one other second control channel and a GPS time comprises:
determining a relationship between the time read on each of the identified first control channel, the one or more other first control channels, the identified second control channel, and the at least one other second control channel and the new GPS time.

* * * * *